United States Patent Office 3,278,211
Patented Oct. 11, 1966

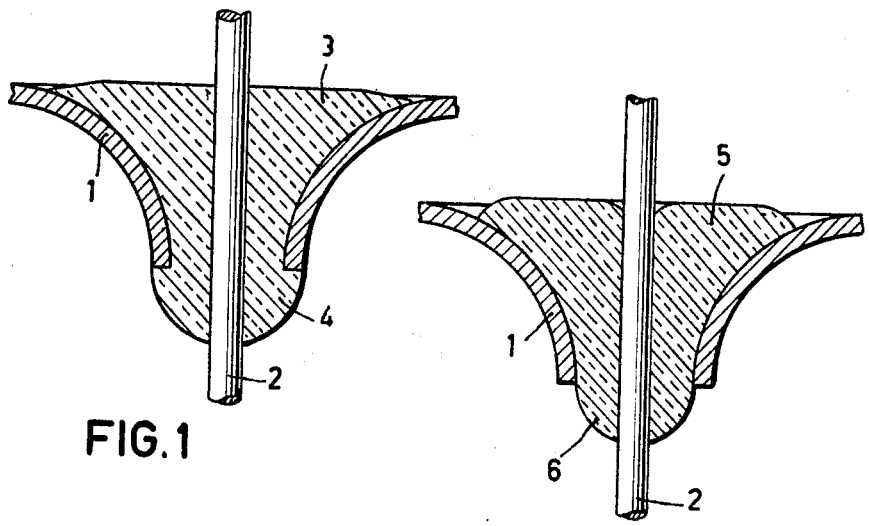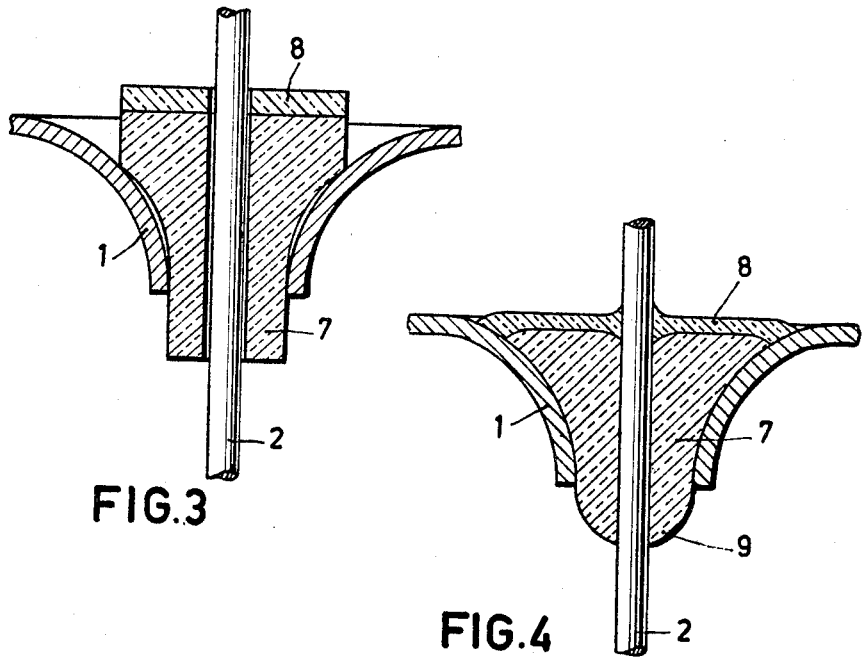

3,278,211
CURRENT LEAD-THROUGH MEMBER
Gerardus Baas and Peter Jan Martin Tacken, Emmasingel, Eindhoven, Netherlands, assignors to North American Philips Company, Inc., New York, N.Y., a corporation of Delaware
Filed Aug. 28, 1964, Ser. No. 392,755
Claims priority, application Netherlands, Sept. 2, 1963, 297,413
2 Claims. (Cl. 287—189.365)

This invention relates to a glass-to-metal seal and in particular to a glass seal in the form of a bead between a current conductor and a surrounding metal part.

In such seals it is necessary to ensure, that the surface of the glass bead exhibits a leakage path of sufficient length. To reduce its dimensions, the bead is therefore given a spherical shape at the narrow end of a tubular metal part. The tubular part may have a diameter which is greater at the side where it merges into the metal plate, so that the bead may be flat in situ.

Since the conductors in such seals are subjected to great mechanical forces the bead is preferably made from a glass which readily crystallizes. However, the difficulty is then encountered that, if the bead is melted completely, it sags too far at the narrow end of the tubular part and flows over the metal thereof so that the glass is liable to crack due to the forces exerted on it by the metal rim.

If the bead is melted to a lesser extent the spherical portion does not flow over the metal rim of the tubular part, thus avoiding cracking thereof, but then the adhesion of the glass to the conductor at the broad end is unsatisfactory so that the seal may become leaky.

These disadvantages may be completely avoided if, according to the invention, the bead consists of two different glasses. The tubular part is filled with a glass which flows not so readily, for example, by adding to it ceramic powder, but preferably the glass used is of a kind which readily crystallizes. This portion of the bead is given a spherical shape at the narrow end without it having flown over the metal rim of the tubular part, while satisfactory adhesion to the conductor at the other end is obtained due to the bead consisting in situ of a layer of a glass which does not crystallize and which satisfactorily flows and adheres to the conductor at the very temperature at which the crystallizing glass forms a satisfactory spherical end.

The invention will now be described with reference to the accompanying diagrammatic drawing, in which:

FIGURE 1 shows part of a known embodiment of a lead-through member;

FIGURE 2 shows part of a member having a bead which has been melted in part;

FIGURE 3 shows part of a member according to the invention before the melting of the glass, and FIGURE 4 shows part of a lead-through member according to the invention after the melting of the glass bead.

Referring now to FIGURE 1, the bead is melted completely so that the glass is satisfactorily fused with the metal parts at the wide end of the tubular part. A spherical portion 4 has been formed at the narrow end whereby the glass has flown, however, over the rim of the tubular part 1. Since the coefficients of expansion of the glass and the metal have been chosen to have different values in order to obtain a compression seal, cracks are found to occurr in the spherical portion 4 of the bead 3 due to the metal rim of the end of the tubular part being situated inside the glass.

If the glass bead 5 shown in FIGURE 2 is heated so as to obtain a spherical portion 6 whereby the glass does not flow over the rim of the tubular part 1, the adhesion to the conductor 2 and the metal of the member is found to be unsatisfactory at the wide end. Although in this case cracking of the glass of the spherical portion 6 of the bead 5 does not occur, the seal may become leaky due to the glass not being fused satisfactorily with the conductor 2.

Thus, in the embodiment of the invention shown in FIGURES 3 and 4, in addition to a pre-shaped part 7, which is preferably made of pressed and sintered powder of a crystallizing glass, a perforated disk 8 consisting of, for example, pressed and sintered glass powder is slipped over the conductor 2. The non-crystallizing glass 8, which flows more readily, forms a satisfactorily adhering closure of the wide end of the bead 7 at the temperature required to give the bead 7 the shape shown in FIGURE 2, whereby the glass of the spherical end of the bead does not flow over the rim of the tubular part 1. The risk of cracking of the spherical portion of the bead is thus avoided while still obtaining a satisfactorily adhering closure of the wide end of the bead by means of the glass layer 8. To obtain the desired shape for the surface of the glass, as graphite cylinder is slipped over the conductor and slightly presses on the glass 8 because of its own weight. If the conductive member contains a plurality of conductors 2, the graphite cylinder also serves to maintain the conductors 2 centred. These conductors are held at their lower end in a holder but the spherical shape of the bead is obtained solely by the action of gravity at an accurately predetermined heating temperature of the glass.

A lead-through member is formed from a fernico-metal plate of 1.5 mms. thick which is provided, by deep drawing and punching, with tubular parts 1 in each of which a pre-shaped body 7 made of pressed and sintered powder of crystallizing glass is placed. The required number of conductors 2 each having a diameter of 2.3 mms. are placed in a holder whereafter the metal member, together with the bodies 7 of crystallizing glass, is placed over the conductors. Next the disks 8, which are made from pressed and sintered powder of a non-crystallizing glass, are slipped over the conductors so as to bear on the bodies 7. Thereafter a graphite cylinder is slipped over the conductors and slightly presses on the disks 8 and lastly, the assembly is heated in an oven to 970° C. so that the body 7 softens and forms a spherical end 9, while the glass 8 forms a satisfactorily adhering layer over the wide end of the glass part 7.

The glass of the body 7 may be of the following composition:

3.5% by weight of $K_2O$
3% by weight of $Al_2O_3$
81.5% by weight of $SiO_2$
12% by weight of $Li_2O$ The glass of the disk 8 may consist of:

69.4% by weight of $SiO_2$
8.1% by weight of $Na_2O$
6.7% by weight of $K_2O$
5.4% by weight of $Al_2O_3$
0.1% by weight of $Fe_2O_3$
10.3% by weight of BaO The adhesion of the glass may be improved by adding a small amount of cobalt oxide.

What is claimed is:

1. A glass-to-metal seal for a lead-in conductor comprising a tubular metal member wider at one end than at the other end, a first glass body surrounding a conductor which extends through the tubular portion and seals the conductor to the metal member, said first glass body having a substantially spherical shape at the narrower end of the tubular member and being constituted of a crystallizable glass, and a second glass body of a noncrystallizable glass joined to said first glass body surrounding and filling the space between said conductor and the wider end of said tubular member.

2. A glass-to-metal seal for a lead-in conductor comprising a tubular metal member wider at one end than at the other end, a first glass body surrounding a conductor which extends through the tubular portion and seals the conductor to the metal member, said glass body having a substantially spherical shape lying within the rim of the narrower end of the tubular member and being constituted of a crystallizable glass, and a second glass body constituted of a non-crystallizable glass joined to said first glass body surrounding and filling the space between said conductor and the wider end of said tubular member.

References Cited by the Examiner
UNITED STATES PATENTS 2,784,532  3/1957  Griffiths _____ 65—59
2,955,386  10/1960  Leinkram _____ 65—154

HARRISON R. MOSELEY, *Primary Examiner.*

P. M. CAUN, *Assistant Examiner.*